(12) United States Patent
Yeh

(10) Patent No.: US 8,296,507 B2
(45) Date of Patent: Oct. 23, 2012

(54) MEMORY MANAGEMENT AND WRITING METHOD AND REWRITABLE NON-VOLATILE MEMORY CONTROLLER AND STORAGE SYSTEM USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 438 days.

(21) Appl. No.: 12/748,748

(22) Filed: Mar. 29, 2010

(65) Prior Publication Data

US 2011/0197014 A1 Aug. 11, 2011

(30) Foreign Application Priority Data

Feb. 5, 2010 (TW) ................................ 99103499 A

(51) Int. Cl.
*G06F 13/00* (2006.01)
(52) U.S. Cl. ........................................................ 711/103
(58) Field of Classification Search ........................ None
See application file for complete search history.

(56) References Cited

U.S. PATENT DOCUMENTS

2002/0041517 A1* 4/2002 Kim et al. ................. 365/185.11
2009/0132756 A1* 5/2009 Hsieh ............................ 711/103

* cited by examiner

*Primary Examiner* — Duc Doan
(74) *Attorney, Agent, or Firm* — J.C. Patents

(57) ABSTRACT

A memory management and writing method for managing a plurality of physical units of a memory chip is provided. The present method includes grouping the physical units into a first physical unit group and a second physical unit group, recording and calculating a first erase count of the first physical unit group and a second erase count of the second physical unit group, and calculating an erase count difference between the first erase count and the second erase count. The present method also includes determining whether the erase count difference is larger than an erase count difference threshold when a write command is received. The method further includes executing a switched writing procedure to write data corresponding to the write command into the memory chip when the erase count difference is larger than the erase count difference threshold. Thereby, the lifespan of the memory chip is effectively prolonged.

24 Claims, 14 Drawing Sheets

MEMORY MANAGEMENT AND WRITING METHOD AND REWRITABLE NON-VOLATILE MEMORY CONTROLLER AND STORAGE SYSTEM USING THE SAME

CROSS-REFERENCE TO RELATED APPLICATION

This application claims the priority benefit of Taiwan application serial no. 99103499, filed on Feb. 5, 2010. The entirety of the above-mentioned patent application is hereby incorporated by reference herein and made a part of this specification.

BACKGROUND

1. Technology Field

The present invention relates to a memory management and writing method and a rewritable non-volatile memory controller and a rewritable non-volatile memory storage system using the same.

2. Description of Related Art

Along with the widespread of digital cameras, cell phones, and MP3 in recently years, the consumers' demand to storage media has increased drastically. Rewritable non-volatile memory is one of the most adaptable memories for such battery-powered portable products due to its characteristics such as data non-volatility, low power consumption, small volume, and non-mechanical structure. A solid state drive (SSD) is a storage device which uses a rewritable non-volatile memory as its storage medium. Rewritable non-volatile memory has been broadly used for storing important personal data thanks to its small volume and large capacity. Thereby, the development and production of rewritable non-volatile memories have become a very important part of the electronic industry in recent years.

Generally speaking, a memory chip is composed of a plurality of physical blocks. Besides, a controller of a rewritable non-volatile memory storage system groups the physical blocks into a plurality of physical units and further logically groups these physical units into a data area and a spare area for managing the physical units. Those physical units in the data area are used for storing valid data written by write commands, and those physical units in the spare area are used for substituting the physical units in the data area when the write commands are executed. In order to allow a host to smoothly access the physical units alternatively used for storing data, the rewritable non-volatile memory storage system provides logical units to the host system. Namely, the rewritable non-volatile memory storage system establishes a logical unit-physical unit mapping table and records the mapping relationship between the logical units and the physical units in the data area in this table to reflect the alternation of the physical units. To be specific, when the rewritable non-volatile memory storage system receives a write command from the host system and is about to write new data into a logical unit, the controller of the rewritable non-volatile memory storage system gets a physical unit from the spare area and writes the valid old data in the physical unit originally mapped to the logical unit and the new data into the physical unit gotten from the spare area. Then, the controller of the rewritable non-volatile memory storage system erases the physical unit originally mapped to the logical unit and associates it to the spare area. After that, the controller of the rewritable non-volatile memory storage system maps the logical unit to the physical unit containing the new data (i.e., the physical unit containing the new data is associated with the data area) in the logical unit-physical unit mapping table. Thereby, the host system simply accesses the logical unit, while the controller of the rewritable non-volatile memory storage system performs data writing and reading on the corresponding physical unit according to the logical unit-physical unit mapping table.

Along with the increase of the capacity of each physical unit in the rewritable non-volatile memory, the time for moving the valid old data has been increased considerably. In order to increase the speed of moving the valid old data, manufacturers of rewritable non-volatile memory provide a copyback instruction set to shorten the time for moving data between physical units. However, in the circuit design of a rewritable non-volatile memory, the physical units composed of physical blocks respectively belong to different planes, and foregoing copyback instruction set is applicable to those physical units belonging to the same plane.

Thus, in existing memory management techniques, in order to apply the copyback instruction set, the controller of a rewritable non-volatile memory storage system groups the physical units into a plurality of physical unit groups according to the planes of the physical units, so as to manage these physical units respectively. Namely, each physical unit group has its own data area and spare area, and the alternation of the physical units is limited within each single physical unit group. Accordingly, the controller of the rewritable non-volatile memory storage system can successfully move the valid old data between the physical units by using the copyback instruction set.

The number of times that each physical unit (or physical block) in a rewritable non-volatile memory can be written or erased is limited, such as 10000 times. Particularly, since the physical units are alternatively used for storing data, when some of the physical units are damaged, the rewritable non-volatile memory storage system cannot be used anymore even as there are still good physical units. Thus, by grouping and managing the physical units in a plurality of physical unit groups, a specific physical unit group will be worn out faster than other physical unit groups if the host system always accesses the corresponding logical unit, such that the lifespan of the rewritable non-volatile memory storage system is shortened.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a memory management and writing method that can effectively increase the speed of writing data into a memory chip and prolong the lifespan of a rewritable non-volatile memory storage apparatus.

Accordingly, the present invention is directed to a rewritable non-volatile memory controller that can effectively increase the speed of writing data into a memory chip and prolong the lifespan of a rewritable non-volatile memory storage apparatus.

Accordingly, the present invention is directed to a rewritable non-volatile memory storage system that can effectively increase the speed of writing data into a memory chip and prolong the lifespan of the memory chip.

According to an exemplary embodiment of the present invention, a memory management and writing method for managing a plurality of physical units of a memory chip is provided. The memory management and writing method includes configuring a plurality of logical units; grouping the physical units into a first physical unit group and a second physical unit group; grouping a portion of the physical units in the first physical unit group into a first data area and a first spare area corresponding to the first data area; grouping a portion of the physical units in the second physical unit group into a second data area and a second spare area corresponding to the second data area; and mapping the logical units to the physical units in the first data area and the second data area. The memory management and writing method also includes recording an erase count of each of the physical units in the first physical unit group and the second physical unit group; calculating a first erase count of the first physical unit group and a second erase count of the second physical unit group according to the erase counts; calculating an erase count difference between the first erase count and the second erase count. The memory management and writing method still includes determining whether the erase count difference is larger than an erase count difference threshold when a write command corresponding to a first logical unit and a new data corresponding to the write command are received, wherein the first logical unit is mapped to a first physical unit among the physical units in the first data area. The memory management and writing method further includes executing a switched writing procedure when the erase count difference is larger than the erase count difference threshold, wherein the switched writing procedure includes getting a second physical unit from the physical units in the second spare area and writing the new data into the second physical unit.

According to an exemplary embodiment of the present invention, a rewritable non-volatile memory controller including a microprocessor unit, a rewritable non-volatile memory interface unit, and a memory management unit is provided. The rewritable non-volatile memory interface unit is coupled to the microprocessor unit and used for coupling to the memory chip. The memory management unit is coupled to the microprocessor unit, wherein the memory management unit has a plurality of program codes, and the microprocessor unit executes the program codes to execute the memory management and writing method described above.

According to an exemplary embodiment of the present invention, a rewritable non-volatile memory storage system including a connector, a memory chip, and a rewritable non-volatile memory controller is provided. The rewritable non-volatile memory controller executes the memory management and writing method described above.

As described above, in exemplary embodiments of the present invention, the speed of writing data into a memory chip is increased and the lifespan of the memory chip is prolonged.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
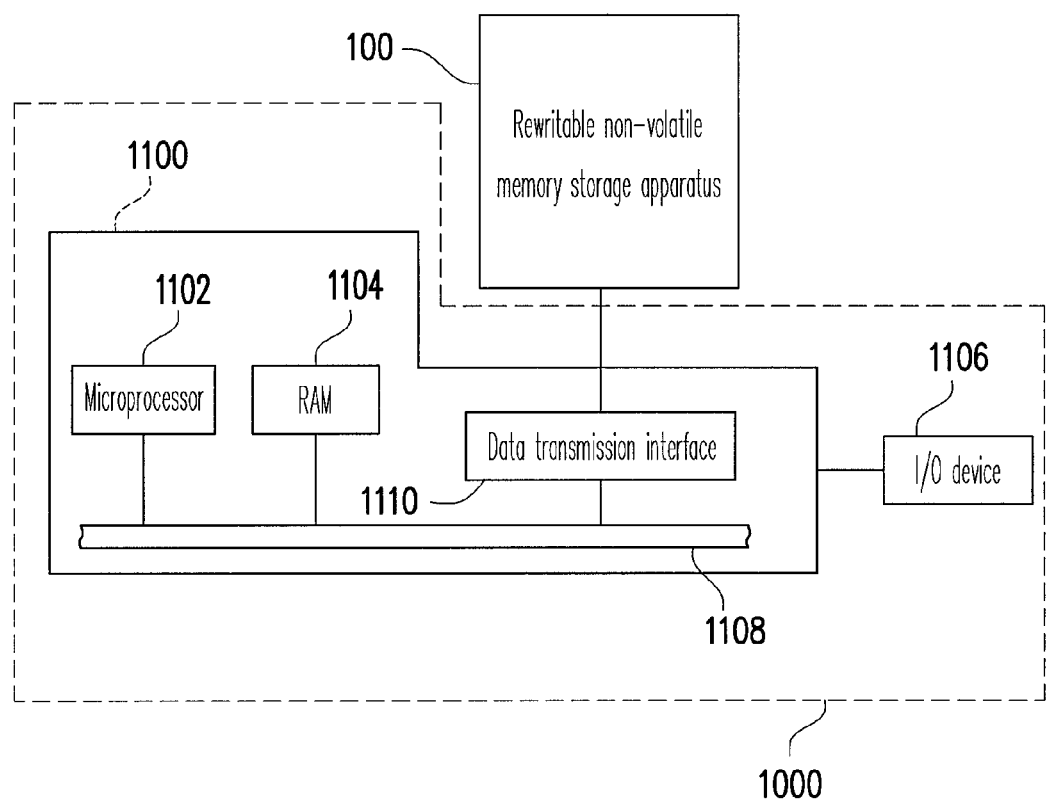
FIG. 1A is a schematic block diagram illustrating a host system using a rewritable non-volatile memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a rewritable non-volatile memory storage apparatus (also referred to as a rewritable non-volatile memory storage system) includes a memory chip and a controller (also referred to as a control circuit). A rewritable non-volatile memory storage apparatus is usually used together with a host system so that the host system can write data into or read data from the rewritable non-volatile memory storage apparatus. A rewritable non-volatile memory storage apparatus may also include an embedded memory and a software that can be executed by the host system to substantially serve as the controller of the embedded memory.

FIG. 1A is a schematic block diagram illustrating a host system using a rewritable non-volatile memory storage apparatus according to an exemplary embodiment of the present invention.

Figure 1B:
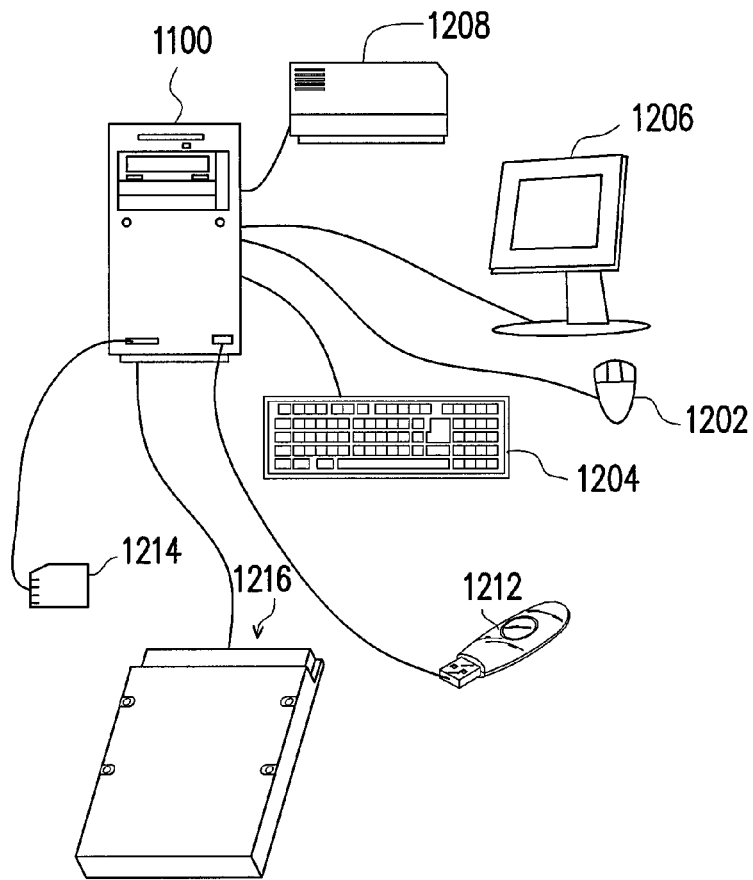
FIG. 1B is a diagram of a computer, an input/output (I/O) device, and a rewritable non-volatile memory storage apparatus according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes the mouse 1202, the keyboard 1204, the display 1206, and the printer 1208 in FIG. 1B. It should be understood that the I/O device 1106 is not limited to the devices illustrated in FIG. 1B, and the I/O device 1106 may further include other devices.

In the present embodiment, the rewritable non-volatile memory storage apparatus 100 is coupled to other components of the host system 1000 through the data transmission interface 1110. Data can be written into or read from the rewritable non-volatile memory storage apparatus 100 through the operations of the microprocessor 1102, the RAM 1104, and the I/O device 1106. The rewritable non-volatile memory storage apparatus 100 may be the flash drive 1212, the memory card 1214, or the solid state drive (SSD) 1216 illustrated in FIG. 1B.

Figure 1C:
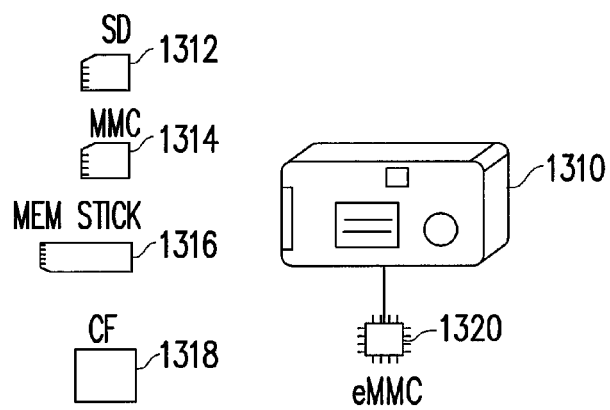
FIG. 1C is a diagram of a host system and a rewritable non-volatile memory storage apparatus according to another exemplary embodiment of the present invention.

Generally speaking, the host system 1000 can be substantially any system that can store data. Even though the host system 1000 is described as a computer system in the present exemplary embodiment, in another exemplary embodiment of the present invention, the host system 1000 may also be a digital camera, a video camera, a telecommunication device, an audio player, or a video player. For example, if the host system is the digital camera (video camera) 1310, the rewritable non-volatile memory storage apparatus is then a SD card 1312, a MMC card 1314, a memory stick 1316, a CF card 1318, or an embedded storage device 1320 (as shown in FIG. 1C) used by the digital camera 1310, wherein the embedded storage device 1320 may be an embedded MMC (eMMC). It should be mentioned that the eMMC is directly coupled to a substrate of the host system.

Figure 2:
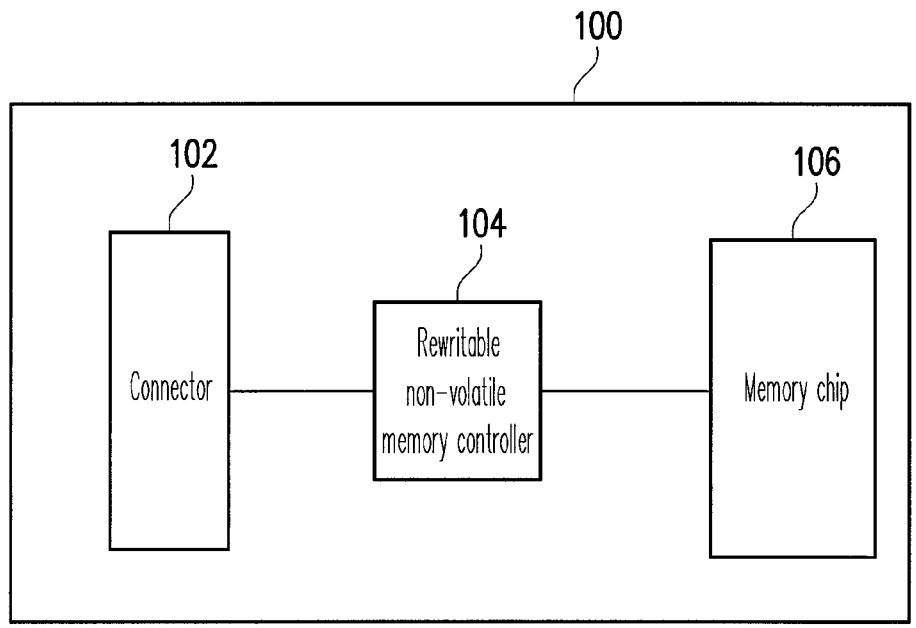
FIG. 2 is a schematic block diagram of the rewritable non-volatile memory storage apparatus in FIG. 1A.

FIG. 2 is a schematic block diagram of the rewritable non-volatile memory storage apparatus in FIG. 1A.

Referring to FIG. 2, the rewritable non-volatile memory storage apparatus 100 includes a connector 102, a rewritable non-volatile memory controller 104, and a memory chip 106.

The connector 102 is coupled to the rewritable non-volatile memory controller 104 and used for coupling to the host system 1000. In the present exemplary embodiment, the connector 102 is a secure digital (SD) interface connector. However, the present invention is not limited thereto, and the connector 102 may also be a universal serial bus (USB) connector, an Institute of Electrical and Electronic Engineers (IEEE) 1394 connector, a peripheral component interconnect (PCI) express connector, a serial advanced technology attachment (SATA) connector, a memory stick (MS) interface connector, a multi media card (MMC) interface connector, a compact flash (CF) interface connector, an integrated device electronics (IDE) connector, or other suitable connectors.

The rewritable non-volatile memory controller 104 executes a plurality of logic gates or control instructions implemented in a hardware form or a firmware form and performs various data operations on the memory chip 106 according to instructions of the host system 1000.

Figure 3:
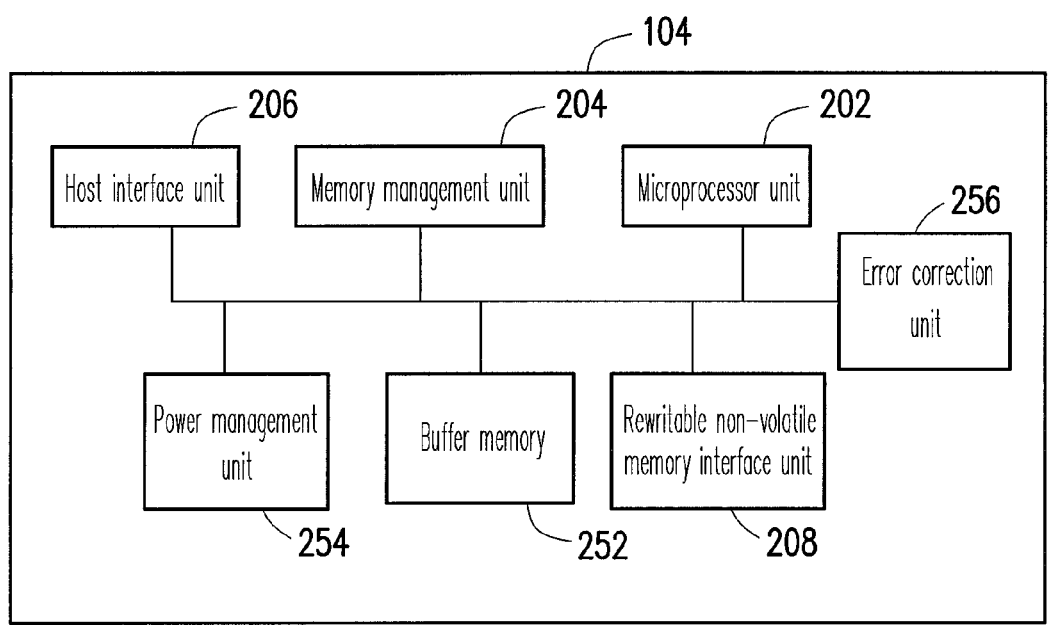
FIG. 3 is a schematic block diagram of a rewritable non-volatile memory controller according to an exemplary embodiment of the present invention.

FIG. 3 is a schematic block diagram of a rewritable non-volatile memory controller according to an exemplary embodiment of the present invention.

Referring to FIG. 3, the rewritable non-volatile memory controller 104 includes a microprocessor unit 202, a memory management unit 204, a host interface unit 206, and a rewritable non-volatile memory interface unit 208.

The microprocessor unit 202 is the main control unit of the rewritable non-volatile memory controller 104, and which cooperates with the memory management unit 204, the host interface unit 206, and the rewritable non-volatile memory interface unit 208 to carry out various operations of the rewritable non-volatile memory storage apparatus 100.

The memory management unit 204 is coupled to the microprocessor unit 202 and works with the same so that the microprocessor unit 202 can execute the data access mechanism and the block management mechanism according to the present exemplary embodiment. To be specific, the memory management unit 204 has a plurality of control instructions, and the microprocessor unit 202 loads these control instructions to execute the data access mechanism and the block management mechanism according to the present exemplary embodiment. The data access mechanism and the block management mechanism will be described in detail below with reference to accompanying drawings.

In the present exemplary embodiment, the memory management unit 204 is implemented in the rewritable non-volatile memory controller 104 as a firmware form. For example, the memory management unit 204 including a plurality of control instructions is burnt into a program memory (for example, a read only memory (ROM)), and the program memory is embedded into the rewritable non-volatile memory controller 104. When the rewritable non-volatile memory storage apparatus 100 is in operation, the control instructions of the memory management unit 204 are executed by the microprocessor unit 202 to realize the data access mechanism and the block management mechanism in the present exemplary embodiment.

In another exemplary embodiment of the present invention, the control instructions of the memory management unit 204 may also be stored in a specific area (for example, a system area in a memory chip exclusively used for storing system data) of the memory chip 106 as program codes. Besides, the memory management unit 204 has a ROM (not shown) and a random access memory (RAM) (not shown). In particular, the ROM has a driving code segment. When the rewritable non-volatile memory controller 104 is enabled, the microprocessor unit 202 first executes this driving code segment to load the control instructions of the memory management unit 204 from the memory chip 106 into the RAM of the memory management unit 204 and then executes these control instructions to perform the data access mechanism and the block management mechanism in the present exemplary embodiment. Additionally, in another exemplary embodiment of the present invention, the memory management unit 204 may also be implemented in the rewritable non-volatile memory controller 104 in a hardware form.

The host interface unit 206 is coupled to the microprocessor unit 202, and used for receiving and identifying commands and data received from the host system 1000. Namely, the commands and data of the host system 1000 are transmitted to the microprocessor unit 202 through the host interface unit 206. In the present exemplary embodiment, the host interface unit 206 is a SD interface corresponding to the connector 102. However, the present invention is not limited thereto, and the host interface unit 206 may also be a PATA interface, a USB interface, an IEEE 1394 interface, a PCI express interface, a SATA interface, a MS interface, a MMC interface, a CF interface, an IDE interface, or other suitable data transmission interfaces.

The rewritable non-volatile memory interface unit 208 is coupled to the microprocessor unit 202 and accesses the memory chip 106. Namely, data to be written into the memory chip 106 is converted by the rewritable non-volatile memory interface unit 208 into a format acceptable to the memory chip 106.

In an exemplary embodiment of the present invention, the rewritable non-volatile memory controller 104 further includes a buffer memory 252. The buffer memory 252 is coupled to the microprocessor unit 202 and temporarily stores commands and data from the host system 1000 or data from the memory chip 106.

In an exemplary embodiment of the present invention, the rewritable non-volatile memory controller 104 further includes a power management unit 254. The power management unit 254 is coupled to the microprocessor unit 202 and controls the power supply of the rewritable non-volatile memory storage apparatus 100.

In an exemplary embodiment of the present invention, the rewritable non-volatile memory controller 104 further includes an error correction unit 256. The error correction unit 256 is coupled to the microprocessor unit 202 and executes an error correcting procedure in order to ensure data accuracy. To be specific, when the microprocessor unit 202 receives a write command from the host system 1000, the error correction unit 256 generates a corresponding error checking and correcting (ECC) code for the data corresponding to the write command, and the microprocessor unit 202 writes the data and the corresponding ECC code into the memory chip 106. Subsequently, when the microprocessor unit 202 reads the data from the memory chip 106, it reads the ECC code corresponding to the data as well, and the error correction unit 256 executes the error correcting procedure on the data according to the ECC code.

Referring to FIG. 2 again, the memory chip 106 is coupled to the rewritable non-volatile memory controller 104. The memory chip 106 is a rewritable non-volatile memory and has a plurality of physical blocks. Each of the physical blocks has a plurality of physical pages, wherein the pages corresponding to the same physical block are individually written and simultaneously erased. To be specific, each physical block is the smallest erasing unit. Namely, each physical block contains the least number of memory cells that are erased together. Each physical page is the smallest programming unit. In other words, each physical page is served as the smallest unit for writing or reading data. Each physical page usually has a user data area and a redundant area. The user data area stores user data, while the redundant area stores system data (for example, the ECC code). In the present exemplary embodiment, the memory chip 106 is a flash memory chip. The memory chip 106 may be a multi level cell (MLC) NAND memory chip. However, the present invention is not limited thereto, and the memory chip 106 may also be a single level cell (SLC) NAND memory chip or other memories having the same characteristics.

FIGS. 4-8 are diagrams illustrating the management of a memory chip according to an exemplary embodiment of the present invention.

It should be understood that the terms used herein for describing the operations (for example, "get", "select", "replace", "group", and "alternate", etc) performed on the physical blocks of the memory chip 106 refer to logical operations performed on these physical blocks. Namely, the physical blocks in the memory chip 106 are logically operated and the actual positions thereof are not changed.

Figure 4:
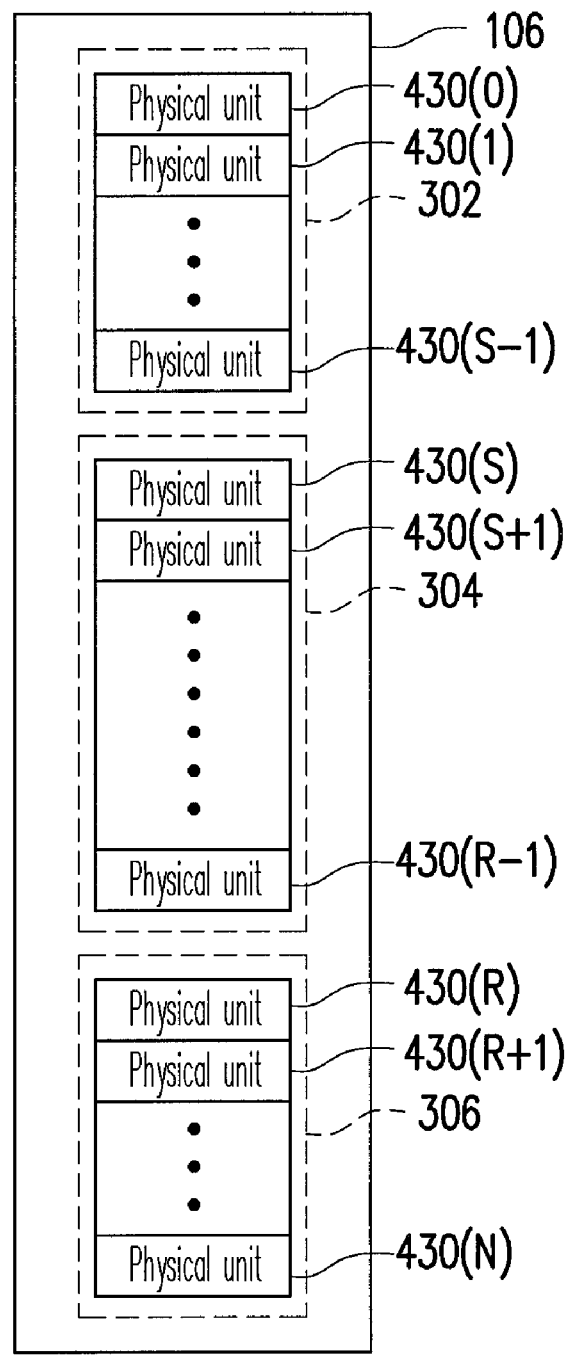
FIGS. 4-8 are diagrams illustrating the management of a memory chip according to an exemplary embodiment of the present invention.

Referring to FIG. 4, the microprocessor unit 202 of the rewritable non-volatile memory controller 104 groups the physical blocks of the memory chip 106 into a plurality of physical units according to the circuit design of the memory chip 106. For example, one physical unit has two physical blocks, and each physical unit is served as an erasing unit. It should be understood that even though each physical unit is composed of two physical blocks in the present exemplary embodiment, the present invention is not limited thereto. In another exemplary embodiment of the present invention, one physical unit may also be composed of one physical block or at least three physical blocks. For example, the physical blocks of the memory chip 106 are grouped into physical units 430(0)-430(N).

In addition, the microprocessor unit 202 of the rewritable non-volatile memory controller 104 logically groups the physical units 430(0)-430(N) into a system area 302, a storage area 304, and a replacement area 306.

The physical units 430(0)-430(S−1) logically belonging to the system area 302 are used for recording system data, such as the manufacturer and model of the memory chip, the number of physical blocks in the memory chip, and the number of pages in each physical block.

The physical units 430(S)-430(R−1) logically belonging to the storage area 304 are used for storing data written by the host system 1000. Namely, the rewritable non-volatile memory storage apparatus 100 uses the physical units in the storage area 304 for actually storing data written by the host system 1000.

The physical units 430(R)-430(N) logically belonging to the replacement area 306 are replacement physical units. For example, when the memory chip 106 is manufactured, 4% of its physical blocks are reserved for replacement purpose. Namely, when the physical blocks in the system area 302 and the storage area 304 are damaged, the physical blocks in the replacement area 306 are used for replacing the damaged physical blocks (i.e., bad blocks). Thus, if there are still normal physical blocks in the replacement area 306 and a physical block is damaged, the microprocessor unit 202 gets a normal physical block from the replacement area 306 for replacing the damaged physical block. If there is no more normal physical block in the replacement area 306 and a physical block is damaged, the rewritable non-volatile memory storage apparatus 100 is declared as being a write protect status and cannot be used for writing data.

In particular, the numbers of physical units in the system area 302, the storage area 304, and the replacement area 306 differ along with different memory specifications. In addition, it has to be understood that how the physical units are associated to the system area 302, the storage area 304, and the replacement area 306 dynamically changes during the operation of the rewritable non-volatile memory storage apparatus 100. For example, when a physical unit in the storage area 304 is damaged and accordingly is replaced by a physical unit in the replacement area 306, the physical unit originally in the replacement area 306 is then associated to the storage area 304.

Figure 5:
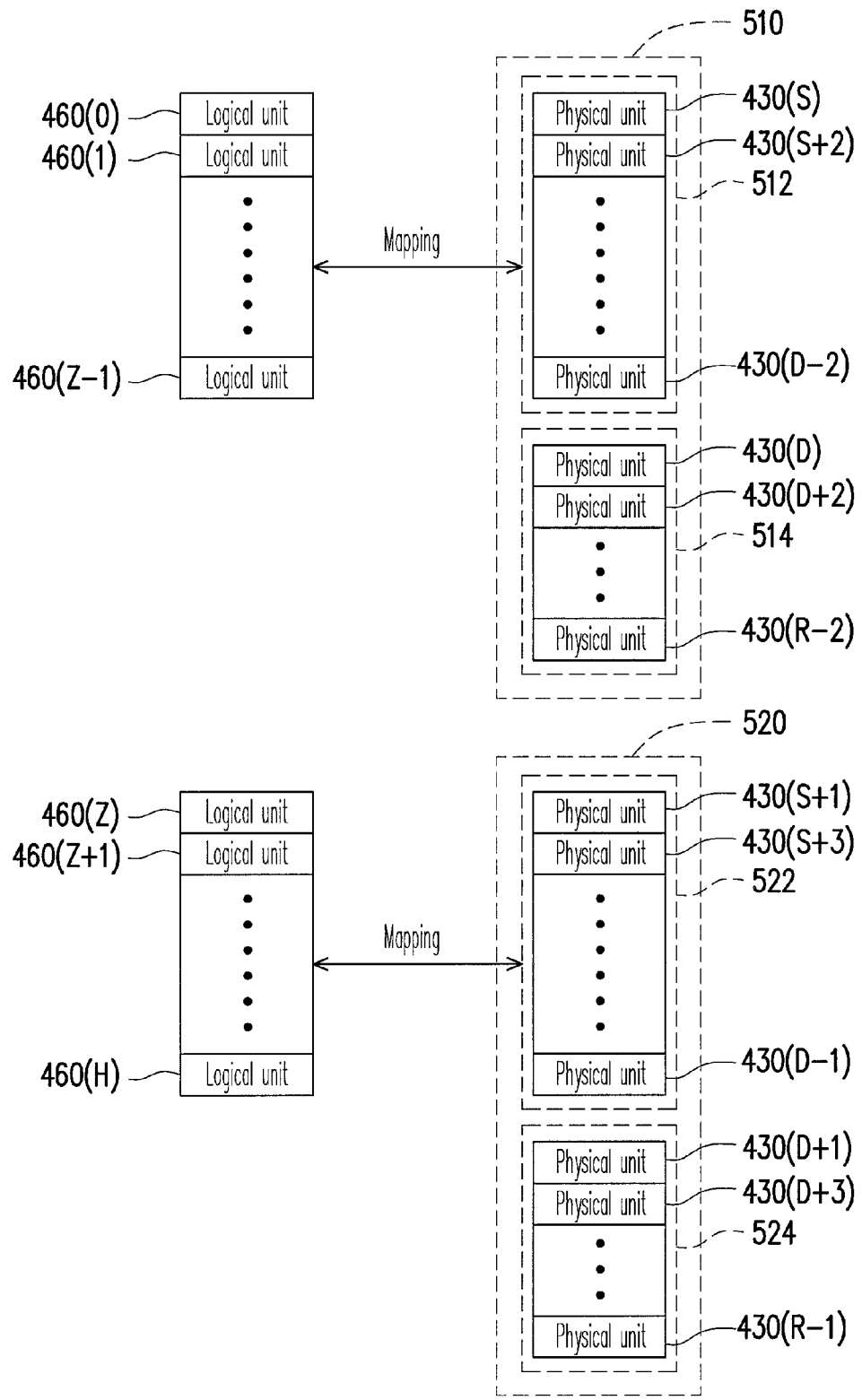

Referring to FIG. 5, in the present exemplary embodiment, the microprocessor unit 202 groups the physical units 430(S)-430(R−1) in the storage area 304 into a first physical unit group 510 and a second physical unit group 520. For example, the first physical unit group 510 is composed of the physical units 430(S), 430(S+2), 430(S+4), . . . , and 430(R−2), and the second physical unit group 520 is composed of the physical units 430(S+1), 430(S+3), 430(S+5), . . . , and 430(R−1). Particularly, in the present exemplary embodiment, the physical blocks of the memory chip 106 are divided into two planes in the circuit design, wherein the physical units 430(S), 430(S+2), 430(S+4), . . . , and 430(R−2) in the first physical unit group 510 belong to one of the two planes, and the physical units 430(S+1), 430(S+3), 430(S+5), . . . , and 430(R−1) in the second physical unit group 520 belong to the other plane. In exemplary embodiments of the present invention, a plane refers to a set of physical blocks in the memory chip 106. Data in a page of this physical block set can be copied into another page of the same physical block set by using a copyback command set. In the present exemplary embodiment, the physical units belonging to the same plane share the same register and the same data transmission bus. However, the present invention is not limited thereto. Additionally, in the present exemplary embodiment, the copyback command set is a command set that reads data from the memory chip 106 into a register of the memory chip 106 and then writes the data back into the memory chip 106 after modifying (or not) the data. Namely, the rewritable non-volatile memory controller 104 needs not to transmit the data to be written to the memory chip 106 again when the data is not to be modified. In other words, the copyback command set is used for reproducing and writing the data in the memory chip 106. In the present exemplary embodiment, the copyback command set has two cycles.

In the present exemplary embodiment, the microprocessor unit 202 groups the physical units in each physical unit group into a data area and a spare area. To be specific, the physical units in the first physical unit group 510 are grouped into a first data area 512 and a first spare area 514, and the physical units in the second physical unit group 520 are grouped into a second data area 522 and a second spare area 524.

The physical units in the first data area 512 and the second data area 522 are used for storing data from the host system 1000. The physical units in the first spare area 514 and the second spare area 524 are used for substituting the physical units in the first data area 512 and the second data area 522. Thus, the physical units in the first spare area 514 and the second spare area 524 are blank or available physical units (i.e., no data is recorded therein or data recorded therein is marked as invalid data). Namely, data has been erased from the physical units in the spare area, or an erasing operation will be performed on a physical unit that is gotten from the spare area for storing data. In short, physical units in the spare area are available physical units.

Figure 6:
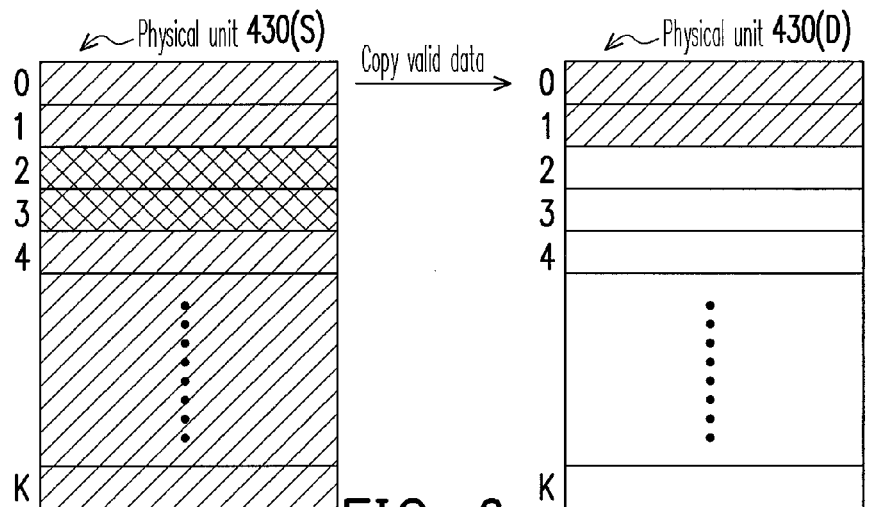
Figure 7:
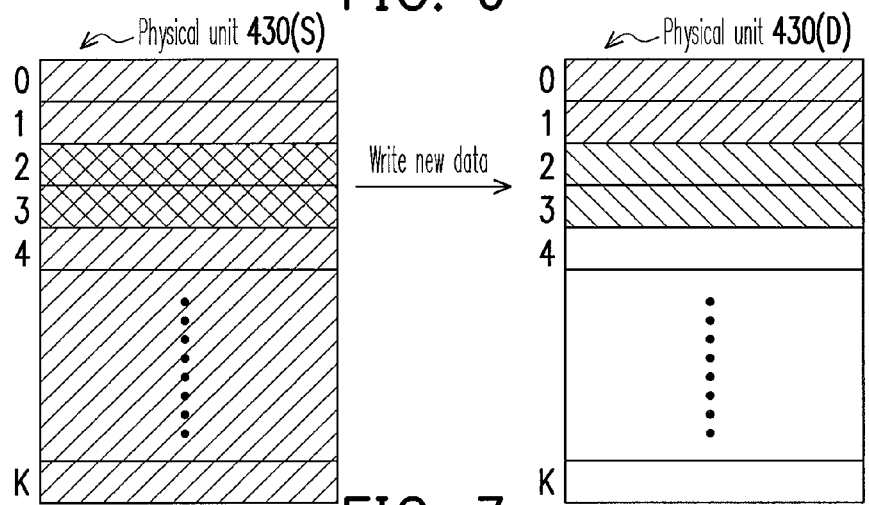
Figure 8:
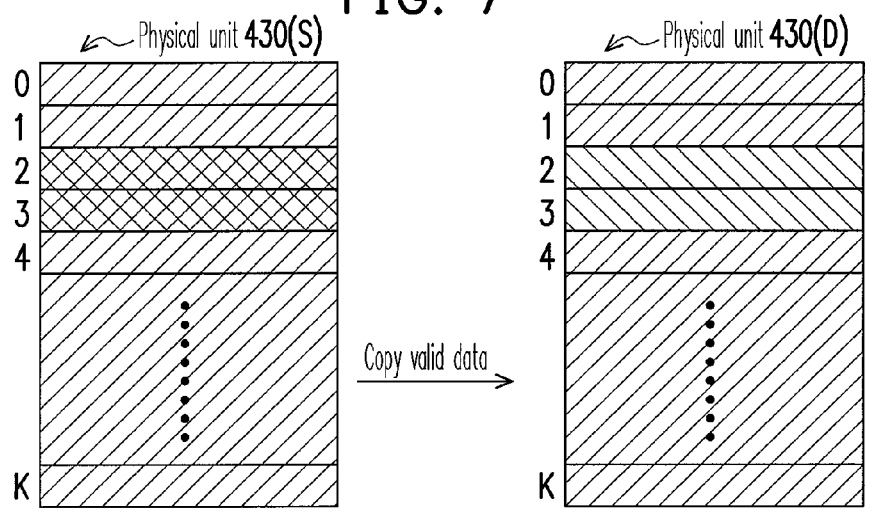

Referring to FIGS. 6-8, taking the first physical unit group 510 as an example, when the rewritable non-volatile memory controller 104 receives a write command from the host system 1000 and accordingly is about to write data into the physical unit 430(S) in the first data area 512, the microprocessor unit 202 gets a physical unit 430(D) from the first spare area 514 for substituting the physical unit 430(S) in the first data area 512. However, the microprocessor unit 202 does not instantly moves all valid data in the physical unit 430(S) to the physical unit 430(D) and erases the physical unit 430(S) at the same time when the microprocessor unit 202 writes the new data into the physical unit 430(D). To be specific, the microprocessor unit 202 copies the valid data before the physical pages (i.e., the $0^{th}$ physical page and the $1^{st}$ physical page) for writing the data in the physical unit 430(S) to the physical unit 430(D) (as shown in FIG. 6) and writes the new data into the $2^{nd}$ physical page and the $3^{rd}$ physical page of the physical unit 430(D) (as shown in FIG. 7). By now the microprocessor unit 202 finishes the data writing operation. Because the valid data in the physical unit 430(S) may become invalid during the next operation (for example, a next write command), instantly moving all valid data in the physical unit 430(S) to the physical unit 430(D) may become meaningless. In the present exemplary embodiment, the action of temporarily maintaining such a mother-child relationship (i.e., the physical unit 430(S) and the physical unit 430(D)) is referred to as opening mother-child units, wherein the original physical unit is referred to as a mother physical unit, and the substitute physical unit is referred to as a child physical unit.

The microprocessor unit 202 integrates the physical unit 430(S) and the physical unit 430(D) into a single physical unit when subsequently the contents of the physical unit 430(S) and the physical unit 430(D) are to be actually combined, so that the efficiency of using these physical units can be increased. Herein the action of integrating the mother-child units is referred to as closing the mother-child units. For example, as shown in FIG. 8, while closing the mother-child units, the microprocessor unit 202 copies remaining valid data (i.e., the $4^{th}$ physical page-$K^{th}$ physical page) in the physical unit 430(S) to the replacement physical unit 430(D), and then erases the physical unit 430(S) and associates it to the first spare area 514. Meanwhile, the microprocessor unit 202 associates the physical unit 430(D) to the first data area 512. Namely, the physical units in the first physical unit group 510 are alternatively used for storing data written by the host system 1000 into the rewritable non-volatile memory storage apparatus 100.

Figure 9:
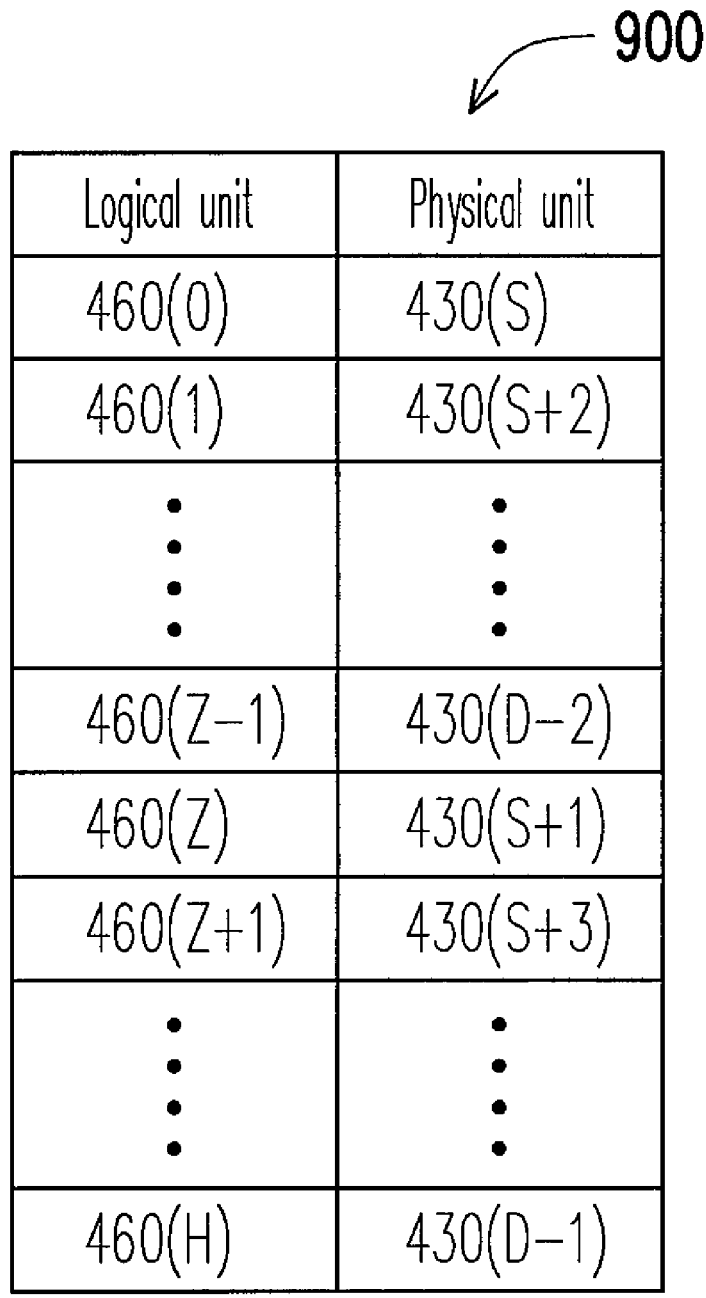
FIG. 9 is a diagram of a logical unit-physical unit mapping table according to an exemplary embodiment of the present invention.

In the present exemplary embodiment, the microprocessor unit 202 configures logical addresses for the host system 1000 so that the host system 1000 can smoothly access data in the physical units through the alternative pattern described above. In addition, the microprocessor unit 202 groups the logical addresses into logical units and maps the logical units to the physical units in the first data area 512. For example, when the rewritable non-volatile memory storage apparatus 100 is initialized (for example, formatted), the logical units 460(0)-460(Z−1) are mapped to the physical units in the first data area 512, and one logical unit is mapped to one physical unit. Herein the microprocessor unit 202 establishes and maintains a logical unit-physical unit mapping table 900 for recording the physical unit mapped to each logical unit (as shown in FIG. 9).

For example, when the host system 1000 is about to write data into a logical address belonging to the logical unit 460 (0), the microprocessor unit 202 identifies that the logical address belongs to the logical unit 460(0) according to a configuration unit (not shown) or an expression. After that, the microprocessor unit 202 identifies that the physical unit 430(S) mapped to the logical unit 460(0) according to the logical unit-physical unit mapping table and opens the mother-child units to get the physical unit 430(D) from the first spare area 514. The microprocessor unit 202 also writes the valid old data in the physical unit 430(S) and the data to be written by the host system 1000 into the physical unit 430(D). For example, when the physical unit mapped to a logical unit is in aforementioned mother-child state (as shown in FIG. 7), the microprocessor unit 202 notes that the logical unit is in the open mother-child state and records the corresponding child physical unit in a child physical unit table (not shown) or a variable. Subsequently, after the microprocessor unit 202 closes the mother-child units (the physical unit 430(S) and the physical unit 430(D)), the microprocessor unit 202 updates the logical unit-physical unit mapping table 600 to re-map the logical unit 460(0) to the physical unit 430(D). In particular, because the physical units in the first physical unit group 510 belong to the same plane, the microprocessor unit 202 can move valid data between the physical units in the first physical unit group 510 by using a copyback command set so as to improve the data writing efficiency.

In other words, the physical units in the first physical unit group 510 are alternatively used for storing data written by the host system 1000 into the rewritable non-volatile memory storage apparatus 100. Besides, when a physical unit is blank or stores no valid data, the physical block is associated with the first spare area 514. When a physical unit stores valid data and is mapped to a logical unit, the physical unit is associated with the first data area 512. Moreover, when a physical unit is gotten from the first spare area 514 for writing data corresponding to a logical unit and is in the open mother-child state, the physical unit is a child physical unit of the physical unit mapped to the logical unit.

Herein, the process of getting a physical unit from the spare area (for example, the first spare area 514) to substitute a physical unit in the data area (for example, the first data area 512) in the same physical unit group for writing the data to be written into a logical unit by the host system 1000 is referred to as a "general writing procedure".

Similarly, the physical units in the second physical unit group 520 are also alternatively used for storing data written by the host system 1000 into the rewritable non-volatile memory storage apparatus 100. For example, when the rewritable non-volatile memory storage apparatus 100 is initialized (for example, formatted), the logical units 460(Z)-460(H) are mapped to the physical units in the second data area 522, and one logical unit is mapped to one physical unit.

In the present exemplary embodiment, the microprocessor unit 202 records erase counts for at lease part of physical unit in the storage area 304. To be specific, the microprocessor unit 202 could record erase counts for each physical unit or a part of physical units in the storage area 304. As described above, a physical unit containing data has to be erased first before it is used for writing data again. Whenever a physical unit is erased, the microprocessor unit 202 updates the erase count of the physical unit. Particularly, in the present exemplary embodiment, the microprocessor unit 202 calculates an average erase count of all the physical units in the first physical unit group 510 and an average erase count of all the physical units in the second physical unit group 520.

As described above, when the host system 1000 frequently accesses specific logical units, the physical unit group corresponding to the logical units has a high wear rate. For example, if the host system 1000 accesses the logical units 460(0)-460(Z−1) frequently, the average erase count of the first physical unit group 510 is higher than that of the second physical unit group 520. In order to level the wear of all the physical units in the memory chip 106, in the present exemplary embodiment, when the rewritable non-volatile memory storage apparatus 100 receives a write command and data corresponding to the write command from the host system 1000, the microprocessor unit 202 identifies the logical unit corresponding to the write command and determines whether the difference (referred as "the average erase count difference" thereafter) between the average erase count of the physical unit group corresponding to the physical unit mapped to the logical unit and the average erase count of another physical unit groups is larger than an erase count difference threshold. If the average erase count difference between the average erase count of the physical unit group corresponding to the physical unit mapped to the logical unit and the average erase count of the other physical unit group is larger than the erase count difference threshold, the microprocessor unit 202 gets a physical unit from the spare area of the other physical unit group and executes a "switched writing procedure". Herein the erase count difference threshold is determined according to the lifespan (i.e., the erase count) of the physical blocks in the memory chip 106. For example, in the present exemplary embodiment, the erase count difference threshold is set to 300. However, the present invention is not limited thereto.

For example, under the situation illustrated in FIG. 9, when the rewritable non-volatile memory storage apparatus 100 receives a write command that instructs to store new data into the logical unit 460(0) from the host system 1000, the microprocessor unit 202 deducts the average erase count of the second physical unit group from the average erase count of the first physical unit group corresponding to the physical unit 430(S) currently mapped to the logical unit 460(0) to obtain an average erase count difference and determines whether the average erase count difference is larger than the erase count difference threshold.

For example, if the average erase count difference is larger than the erase count difference threshold, the microprocessor unit 202 gets the physical unit 430(D+1) from the second spare area 524 to open mother-child units. Besides, when the mother-child relationship between the physical unit 430(S) and the physical unit 430(D+1) is closed, the logical unit 460(0) is re-mapped to the physical unit 430(D+1), the physical unit 430(S) is associated with the first spare area 514, and the physical unit 430(D+1) is associated with the second data area 522. It should be mentioned that the microprocessor unit 202 moves the valid data by using general read and write commands because the physical unit 430(S) and the physical unit 430(D+1) belong to different planes. Namely, the rewritable non-volatile memory controller 104 first reads the valid data from the memory chip 106 and then transmits the valid data back into the memory chip 106 to write the data.

Accordingly, when the average wear of the physical units in the first physical unit group 510 is higher than that of the physical units in the second physical unit group 520, the microprocessor unit 202 constantly executes the switched writing procedure to make the number of logical units mapped to the second data area 522 of the second physical unit group 520 to be larger than the number of logical units mapped to the first data area 512 of the first physical unit group 510. Namely, the physical units in the second physical unit group 520 are more likely to be used for storing data from the host system 1000, so that the wear of the physical units in the first physical unit group 510 and the second physical unit group 520 is leveled. For example, when the host system 1000 stores another new data into the logical unit 460(0), the microprocessor unit 202 gets a physical unit from the second spare area 524 of the second physical unit group 520 for writing the data. It should be mentioned that because the physical unit 430(D+1) currently mapped to the logical unit 460(0) belongs to the second physical unit group 520 and to the same plane as the physical unit gotten from the second spare area, the microprocessor unit 202 moves the valid data between the physical units in the second physical unit group 520 by using the copyback command set so that the data writing efficiency is improved.

It should be mentioned that if the average wear of the physical units in the first physical unit group 510 is higher than that of the physical units in the second physical unit group 520, when the microprocessor unit 202 repeatedly executes the switched writing procedure, the number of physical units in the first spare area 514 continuously increases and the number of physical units in the second spare area 524 continuously decreases. In particular, if the number of physical units in the second spare area 524 keeps decreasing, the number of physical units in the second spare area 524 may be insufficient for writing data through the alternative method. In an exemplary embodiment of the present invention, besides determining whether the average erase count difference between the average erase counts of different physical unit groups is larger than the erase count difference threshold, the microprocessor unit 202 also determining whether the difference (referred as "the logical unit amount difference" thereafter) between the number of logical units mapped to the physical unit group corresponding to the physical unit for writing data and the number of logical units mapped to another physical unit group is smaller than a logical unit amount difference threshold. Besides, if the logical unit amount difference is not smaller than the logical unit amount difference threshold, the microprocessor unit 202 executes the general writing procedure instead of the switched writing procedure. Namely, the microprocessor unit 202 records the number of logical units mapped to each physical unit group and determines whether to execute the switched writing procedure according to the number of logical units mapped to each physical unit group. Herein the logical unit amount difference threshold is determined according to the initial number of physical units configured in the spare area. For example, the logical unit amount difference threshold has to be smaller than or equal to 6 if there are 4 physical units in each spare area. Namely, at least one physical unit should be kept in each spare area for executing the data writing procedure.

For example, under the status illustrated in FIG. 9, when the rewritable non-volatile memory storage apparatus 100 receives a write command that instructs to store new data into the logical unit 460(0) from the host system 1000 and the average erase count difference is larger than the erase count difference threshold, the microprocessor unit 202 deducts the number of logical units mapped to the first physical unit group 510 corresponding to the physical unit 430(S) from the number of logical units mapped to the second physical unit group to obtain the logical unit amount difference and determines whether the logical unit amount difference is smaller than the logical unit amount difference threshold.

If the logical unit amount difference is not smaller than the logical unit amount difference threshold, the microprocessor unit 202 executes the general writing procedure to write data. Contrarily, if the logical unit amount difference is smaller than the logical unit amount difference threshold, the microprocessor unit 202 executes the switched writing procedure to write data.

In another exemplary embodiment, the microprocessor unit 202 calculates the highest erase count or the total erase count of all the physical units in each physical unit group. And, the microprocessor unit 202 executes the switched writing procedure when the difference between the highest erase counts or the total erase counts of the physical unit group corresponding to the physical unit mapped to the logical unit and another physical unit group is larger than the erase count difference threshold.

In yet another exemplary embodiment, when the rewritable non-volatile memory storage apparatus 100 receives a write command for storing new data into a logical unit from the host system 1000, the rewritable non-volatile memory storage apparatus 100 determines whether the average erase count difference is larger than the erase count difference threshold, so as to determine whether to execute the switched writing procedure, after a predetermined interval. The interval can be determined according to the erase count of the physical units in the storage area 304. For example, the microprocessor unit 202 configurates an erase count for the memory chip 106 and updates the erase count (for example, increases the erase count by 1) every time when an erasing operation is performed. In addition, whether the average erase count difference is larger than the erase count difference threshold is determined, so as to determine whether to execute the switched writing procedure, when the erase count reaches a predetermined value. Herein the predetermined value is set to 500. However, the present invention is not limited thereto. In addition, the erase count could be reset (for example, set to zero) after foregoing determination step is executed.

FIGS. 10-15 illustrate examples of writing data according to an exemplary embodiment of the present invention. For the convenience of description, in these examples, the mother-child units are opened for writing data and instantly closed after the data is written, and accordingly aforementioned temporary mother-child state does not exit.

Figure 10:
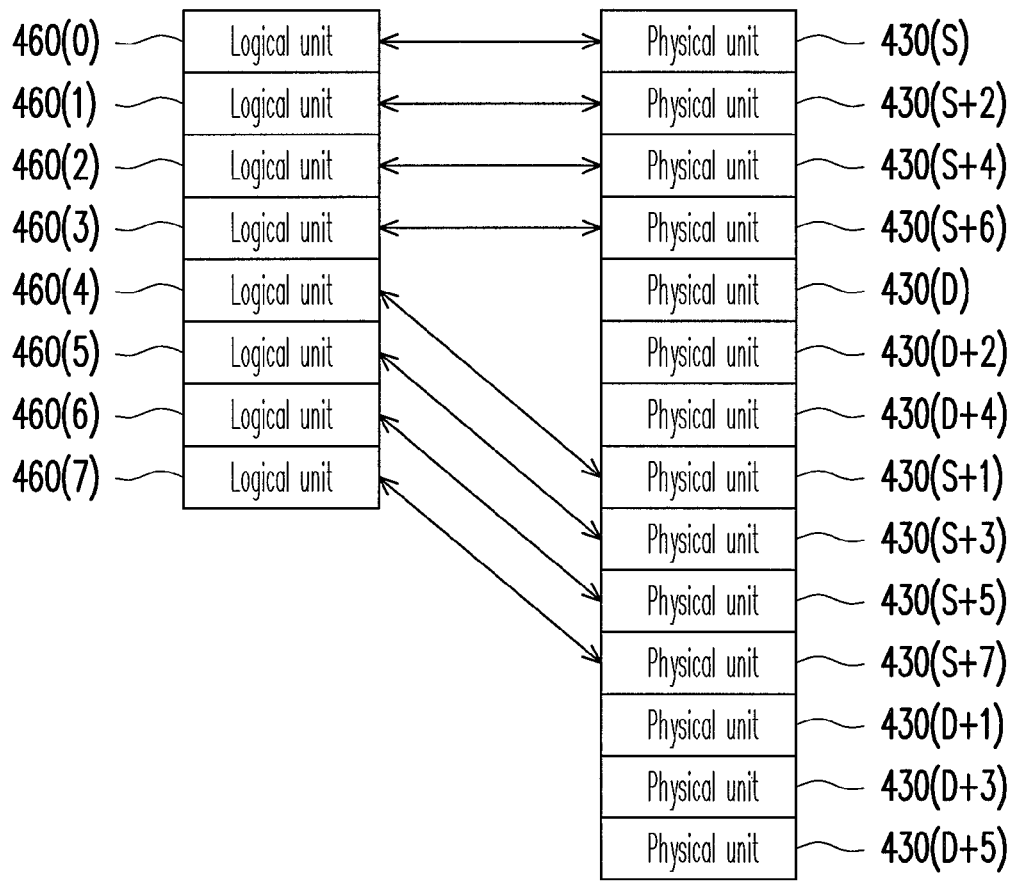
FIGS. 10-15 illustrate examples of writing data according to an exemplary embodiment of the present invention.

Referring to FIG. 10, in the present example, the first data area 512 of the first physical unit group 510 has 4 physical units (i.e., the physical units 430(S), 430(S+2), 430(S+4), and 430(S+6)), and the first spare area 514 thereof has 3 physical units (i.e., the physical units 430(D), 430(D+2), and 430(D+4)). The second data area 522 of the second physical unit group 520 has 4 physical units (i.e., the physical units 430(S+1), 430(S+3), 430(S+5), and 430(S+7)), and the second spare area 524 thereof has 3 physical units (i.e., the physical units 430(D+1), 430(D+3), and 430(D+5)). The logical units 460(0)-460(3) are mapped to the physical units in the first data area 512, and the logical units 460(4)-460(7) are mapped to the physical units in the second data area 522. In addition, in the present example, the average erase count difference obtained by deducting the average erase count of the physical units in the second physical unit group 520 from the average erase count of the physical units in the first physical unit group 510 is larger than the erase count difference threshold, and the logical unit amount difference threshold is 4.

Figure 11:
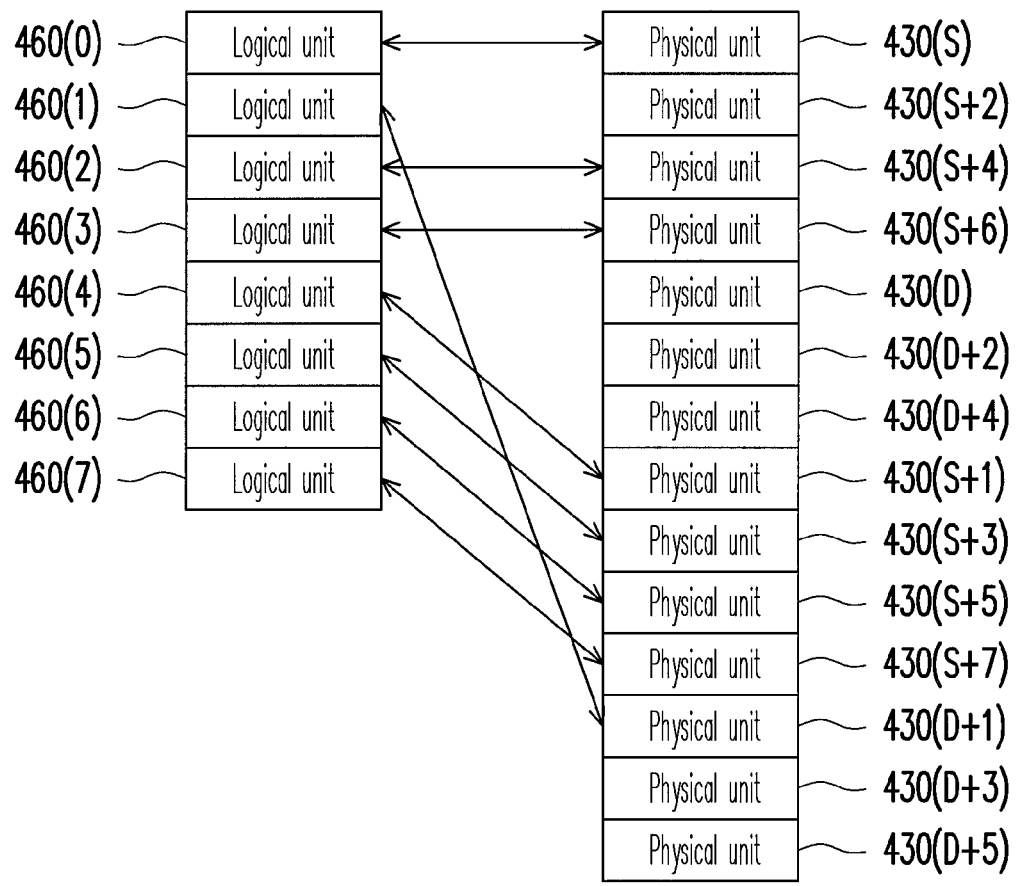

Referring to FIG. 10 and FIG. 11, if the host system 1000 is about to store data into the logical unit 460(1), because the logical unit amount difference obtained by deducting the number of logical units mapped to the physical units in the first physical unit group 510 from the number of logical units mapped to the physical units in the second physical unit group 520 is 0, the microprocessor unit 202 gets the physical unit 430(D+1) from the second spare area 524 for writing the data and re-maps the logical unit 460(1) to the physical unit 430(D+1). Then, the physical unit 430(S+2) is associated to the first spare area 514, and the physical unit 430(D+1) is associated to the second data area 522.

Figure 12:
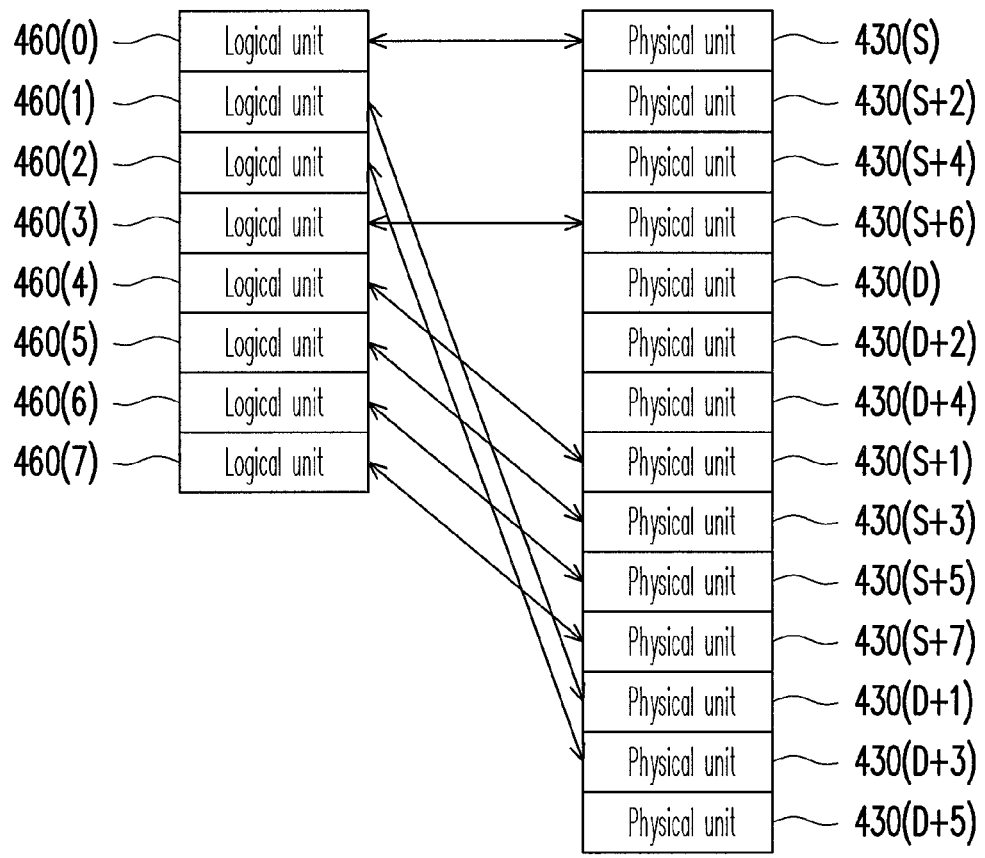

Referring to FIG. 12, if the host system 1000 is about to store data into the logical unit 460(2) under the status illustrated in FIG. 11, because the logical unit amount difference obtained by deducting the number of logical units mapped to the physical units in the first physical unit group 510 from the number of logical units mapped to the physical units in the second physical unit group 520 is 2, the microprocessor unit 202 gets the physical unit 430(D+3) from the second spare area 524 for writing the data and re-maps the logical unit 460(2) to the physical unit 430(D+3). Then, the physical unit 430(S+4) is associated with the first spare area 514, and the physical unit 430(D+3) is associated with the second data area 522.

Figure 13:
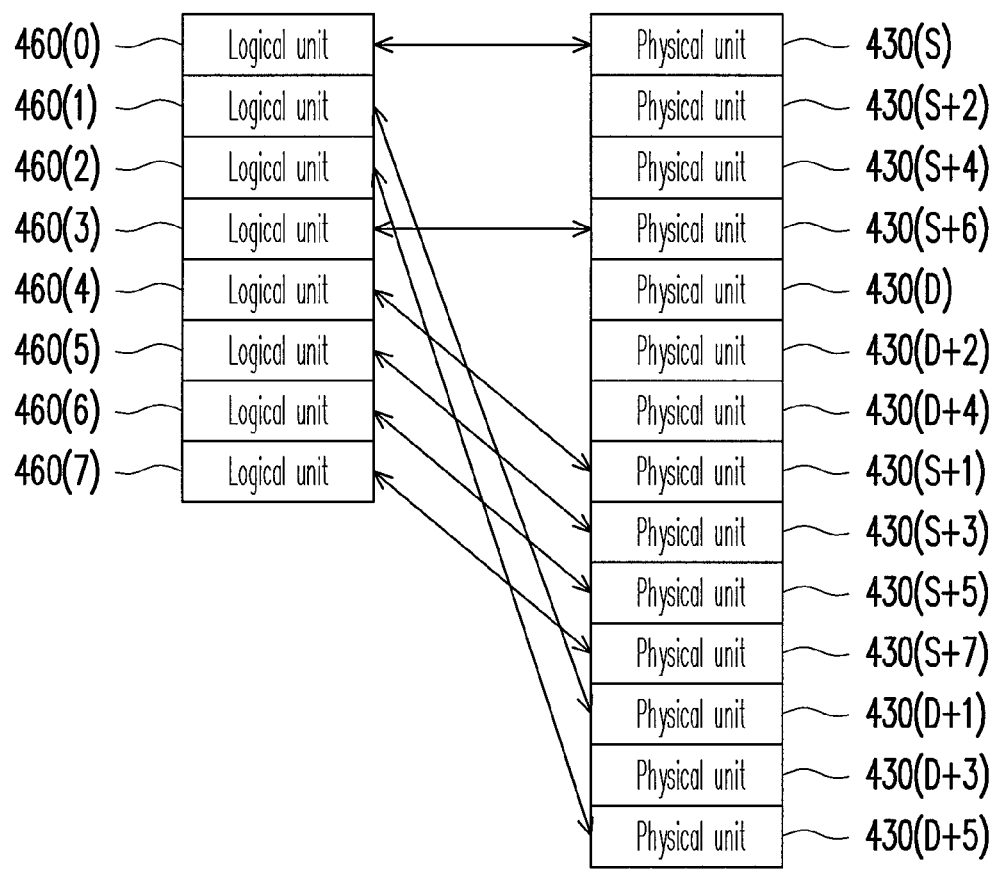

Referring to FIG. 13, if the host system 1000 is about to store data into the logical unit 460(2) under the status illustrated in FIG. 12, because the logical unit 460(2) is currently mapped to a physical unit in the second physical unit group 520 and the average erase count difference obtained by deducting the average erase count of the physical units in the second physical unit group 520 from the average erase count of the physical units in the first physical unit group 510 is much larger than the erase count difference threshold, the microprocessor unit 202 gets the physical unit 430(D+5) from the second spare area 524 for writing the data and re-maps the logical unit 460(2) to the physical unit 430(D+5). Then, the physical unit 430(D+3) is associated with the second spare area 524, and the physical unit 430(D+5) is associated with the second data area 522.

Figure 14:
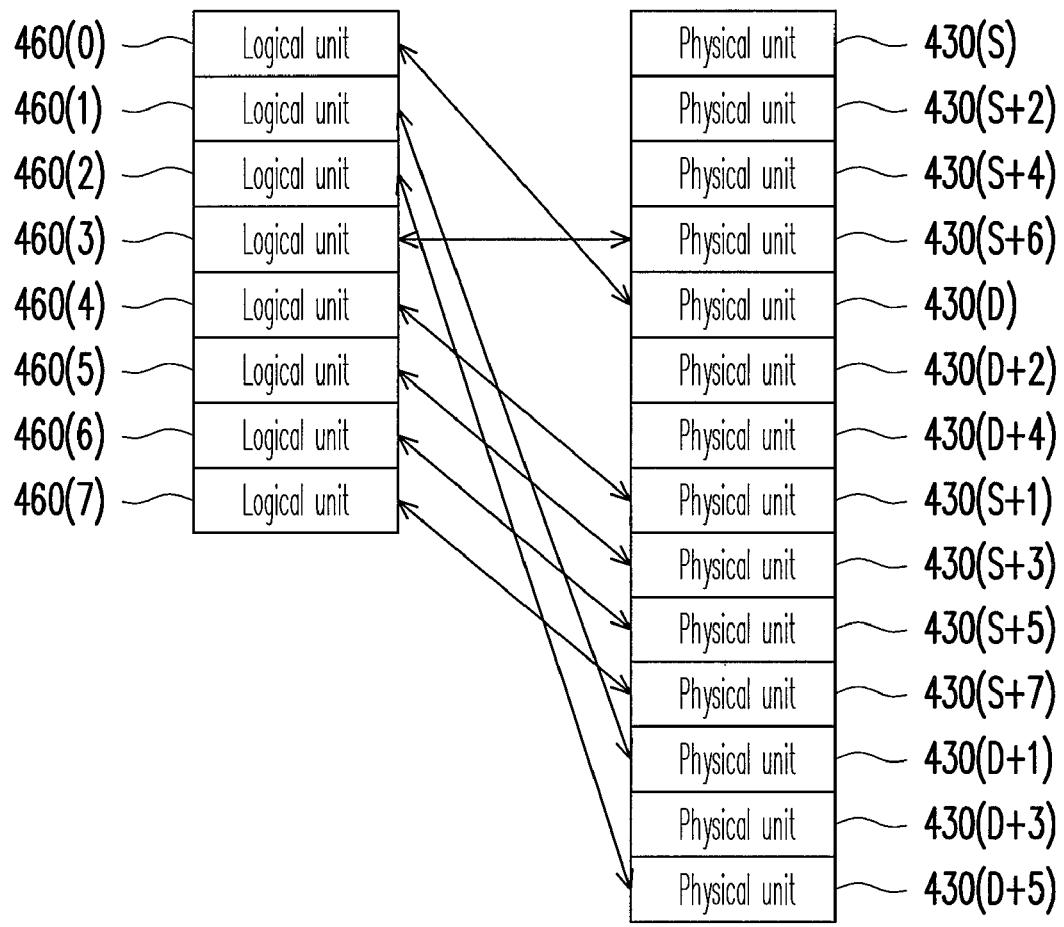

Referring to FIG. 14, if the host system 1000 is about to store data into the logical unit 460(0) under the status illustrated in FIG. 13, because the logical unit amount difference obtained by deducting the number of logical units mapped to the physical units in the first physical unit group 510 from the number of logical units mapped to the physical units in the second physical unit group 520 is 4, the microprocessor unit 202 gets the physical unit 430(D) from the first spare area 514 for writing the data and re-maps the logical unit 460(0) to the physical unit 430(D). Then, the physical unit 430(S) is associated with the first spare area 514, and the physical unit 430(D) is associated with the first data area 512.

It should be mentioned that in another exemplary embodiment of the present invention, the microprocessor unit 202 determines whether the logical unit amount difference between the numbers of logical units mapped to different physical unit groups is equal to the logical unit amount difference threshold when the rewritable non-volatile memory storage apparatus 100 is idling. Besides, when the logical unit amount difference is equal to the logical unit amount difference threshold, the microprocessor unit 202 executes the wear levelling procedure to balance the numbers of logical units mapped to different physical unit groups. Herein that the rewritable non-volatile memory storage apparatus 100 is idling indicates that the microprocessor unit 202 has not received any command from the host system 1000 for a period of time.

Figure 15:
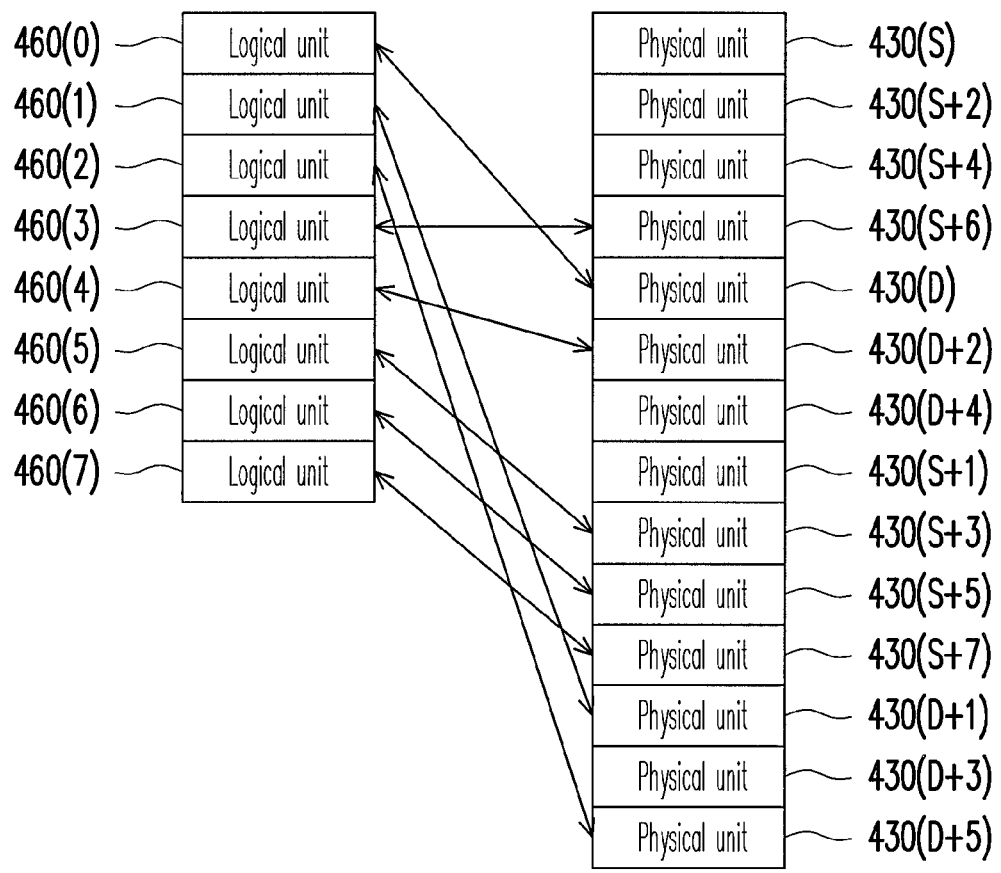

For example, referring to FIG. 15, if the microprocessor unit 202 determines that the logical unit amount difference obtained by deducting the number of logical units mapped to the first physical unit group 510 from the number of logical units mapped to the second physical unit group 520 is equal to the logical unit amount difference threshold when the rewritable non-volatile memory storage apparatus 100 is idling under the status illustrated in FIG. 14, the microprocessor unit 202 randomly gets a physical unit 430(S+1) from the second data area 522 and a physical unit 430(D+2) from the first spare area 514 and moves data in the physical unit 430(S+1) to the physical unit 430(D+2), and the microprocessor unit 202 then associates the physical unit 430(S+1) to the second spare area 524 and the physical unit 430(D+2) to the first data area 512 and re-maps the logical unit 460(4) originally mapped to the physical unit 430(S+1) to the physical unit 430(D+2). Thus, the numbers of logical units mapped to different physical unit groups are balanced, and the situation that the number of the physical units in the spare area of a specific physical unit group is insufficient to be alternatively used for writing data is avoided. It should be mentioned that even though the physical units are randomly gotten for executing the wear levelling procedure in the present exemplary embodiment, the present invention is not limited thereto. In another exemplary embodiment of the present invention, the microprocessor unit 202 may get the physical units according to the erase count of each physical unit. For example, the microprocessor unit 202 gets the physical unit having the highest erase count from the data area and the physical unit having the lowest erase count from the spare area for executing the wear levelling procedure.

Figure 16:
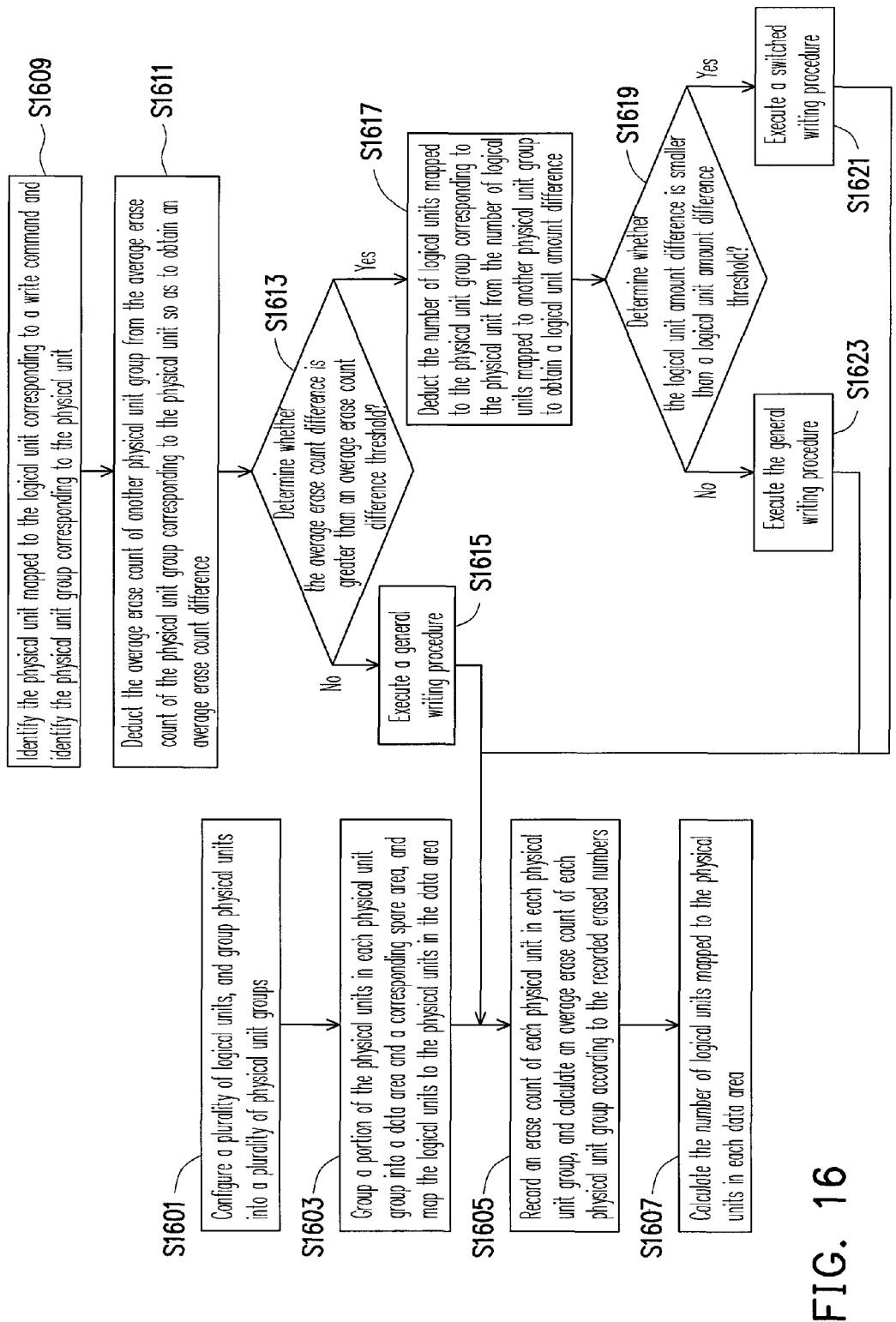
FIG. 16 is a flowchart of a memory management and writing method according to an exemplary embodiment of the present invention.

FIG. 16 is a flowchart of a memory management and writing method according to an exemplary embodiment of the present invention.

Referring to FIG. 16, step S1601 is executed when the rewritable non-volatile memory storage apparatus 100 is initialized. In step S1601, the microprocessor unit 202 configures a plurality of logical units and groups the physical units into a plurality of physical unit groups. For example, the physical units in each physical unit group belong to the same plane.

In step S1603, the microprocessor unit 202 groups a portion of the physical units in each physical unit group into a data area and a corresponding spare area and maps the logical units to the physical units in the data area.

In step S1605, the microprocessor unit 202 records an erase count for each physical unit in each physical unit group and calculates an average erase count of each physical unit group according to the recorded erase counts.

In step S1607, the microprocessor unit 202 calculates the number of logical units mapped to the physical units in each data area.

Subsequently, step S1609 is executed when the rewritable non-volatile memory storage apparatus 100 receives a write command and data corresponding to the write command. In step S1609, the microprocessor unit 202 identifies the physical unit mapped to the logical unit corresponding to the write command and identifies the physical unit group corresponding to the physical unit.

Next, in step S1611, the microprocessor unit 202 deducts the average erase count of another physical unit group from the average erase count of the physical unit group corresponding to the physical unit to obtain an average erase count difference. In step S1613, the microprocessor unit 202 determines whether the average erase count difference obtained in step S1611 is larger than an erase count difference threshold.

If the average erase count difference is not larger than the erase count difference threshold, in step S1615, the microprocessor unit 202 executes the general writing procedure. After that, step S1605 is executed.

If the average erase count difference is larger than the erase count difference threshold, in step S1617, the microprocessor unit 202 deducts the number of logical units mapped to the physical unit group corresponding to the physical unit from the number of logical units mapped to another physical unit group to obtain a logical unit amount difference.

After that, in step S1619, the microprocessor unit 202 determines whether the logical unit amount difference obtained in step S1617 is smaller than a logical unit amount difference threshold. If the logical unit amount difference is smaller than the logical unit amount difference threshold, the microprocessor unit 202 executes the switched writing procedure in step S1621, and step S1605 is then executed. Contrarily, if the logical unit amount difference is not smaller than the logical unit amount difference threshold, the microprocessor unit 202 executes the general writing procedure in step S1623, and step S1605 is then executed.

As described above, in exemplary embodiments of the present invention, the memory management and writing method, the rewritable non-volatile memory controller, and the rewritable non-volatile memory storage apparatus are provided, wherein physical units are grouped into physical unit groups corresponding to different planes, and a general writing procedure could be executed by using a copyback command set, so that the data writing efficiency is effectively improved. Meanwhile, when the erase counts of the physical units are not balanced, the wear of the physical units can be effectively levelled through a switched writing procedure, so that the lifespan of the rewritable non-volatile memory storage apparatus can be effectively prolonged. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management and writing method, for managing a plurality of physical units of a memory chip, the memory management and writing method comprising:
configuring a plurality of logical units;
grouping the physical units into a first physical unit group and a second physical unit group;
grouping a portion of the physical units in the first physical unit group into a first data area and a first spare area corresponding to the first data area;
grouping a portion of the physical units in the second physical unit group into a second data area and a second spare area corresponding to the second data area;
mapping the logical units to the physical units in the first data area and the second data area;
recording erase counts corresponding to a plurality of the physical units in the first physical unit group and the second physical unit group;
calculating a first erase count of the first physical unit group and a second erase count of the second physical unit group according to the erase counts, and calculating an erase count difference between the first erase count and the second erase count; and
determining whether the erase count difference is larger than an erase count difference threshold when a write command corresponding to a first logical unit among the logical units and new data corresponding to the write command are received, wherein the first logical unit is mapped to a first physical unit among the physical units in the first data area,
wherein a switched writing procedure is executed when the erase count difference is larger than the erase count difference threshold, and the switched writing procedure comprises:
getting a second physical unit from the physical units in the second spare area; and
writing the new data into the second physical unit.

2. The memory management and writing method according to claim 1, wherein the switched writing procedure further comprises:
associating the second physical unit to the second data area and re-mapping the first logical unit to the second physical unit.

3. The memory management and writing method according to claim 2 further comprising:
calculating a logical unit amount difference, wherein the logical unit amount difference is obtained by deducting the number of the logical units mapped to the physical units in the second data area from the number of the logical units mapped to the physical units in the first data area; and
determining whether the logical unit amount difference is equal to a logical unit amount difference threshold,
wherein a wear levelling procedure is executed when the logical unit amount difference is equal to the logical unit amount difference threshold, and the wear levelling procedure comprises:
getting a fourth physical unit from the physical units in the first spare area;

getting a fifth physical unit from the physical units in the second data area, wherein the fifth physical unit is mapped to a second logical unit among the logical units;
moving valid data in the third logical unit to the fourth physical unit; and
associating the fourth physical unit to the first data area, associating the fifth physical unit to the second spare area, and re-mapping the second logical unit to the fourth physical unit.

4. The memory management and writing method according to claim 1, wherein a general writing procedure is executed when the erase count difference is not larger than the erase count difference threshold, and the general writing procedure comprises:
getting a third physical unit from the physical units in the first spare area; and
writing the new data into the third physical unit.

5. The memory management and writing method according to claim 4, wherein the general writing procedure further comprises:
moving valid data in the first physical unit to the third physical unit by using a copyback command set, wherein the copyback command set is used for reproducing and writing data in the memory chip.

6. The memory management and writing method according to claim 4, wherein the general writing procedure further comprises:
associating the third physical unit to the first data area, and re-mapping the first logical unit to the third physical unit.

7. The memory management and writing method according to claim 1, wherein the physical units in the memory chip respectively belong to a first plane and a second plane,
wherein the step of grouping the physical units into the first physical unit group and the second physical unit group comprises:
grouping the physical units belonging to the first plane into the first physical unit group and the physical units belonging to the second plane into the second physical unit group,
wherein data corresponding to the first plane cannot be copied to the second plane by the copyback command set, and data corresponding to the second plane cannot be copied to the first plane by the copyback command set.

8. The memory management and writing method according to claim 1 further comprising:
calculating a logical unit amount difference, wherein the logical unit amount difference is obtained by deducting the number of the logical units mapped to the physical units in the second data area from the number of the logical units mapped to the physical units in the first data area,
wherein the step of determining whether the erase count difference is larger than the erase count difference threshold comprises: determining whether the erase count difference is larger than the erase count difference threshold and whether the logical unit amount difference is smaller than a logical unit amount difference threshold,
wherein the switched writing procedure is executed when the erase count difference is larger than the erase count difference threshold and the logical unit amount difference is smaller than the logical unit amount difference threshold.

9. The memory management and writing method according to claim 1 further comprising:
configuring an erase count for the memory chip; and
determining whether the erase count is equal to a predetermined value when the write command corresponding to the first logical unit among the logical units and the new data corresponding to the write command are received,
wherein the step of determining whether the erase count difference is larger than the erase count difference threshold is executed when the erase count is equal to the predetermined value.

10. A rewritable non-volatile memory controller, for managing a plurality of physical units of a memory chip, the rewritable non-volatile memory controller comprising:
a microprocessor unit;
a rewritable non-volatile memory interface unit, coupled to the microprocessor unit, for coupling to the memory chip; and
a memory management unit, coupled to the microprocessor unit, wherein the memory management unit has a plurality of program codes, and the microprocessor unit executes the program codes to execute:
configuring a plurality of logical units;
grouping the physical units into a first physical unit group and a second physical unit group;
grouping a portion of the physical units in the first physical unit group into a first data area and a first spare area corresponding to the first data area;
grouping a portion of the physical units in the second physical unit group into a second data area and a second spare area corresponding to the second data area;
mapping the logical units to the physical units in the first data area and the second data area;
recording erase counts corresponding to a plurality of the physical units in the first physical unit group and the second physical unit group;
calculating a first erase count of the first physical unit group and a second erase count of the second physical unit group according to the erase counts, and calculating an erase count difference between the first erase count and the second erase count; and
determining whether the erase count difference is larger than an erase count difference threshold when a write command corresponding to a first logical unit among the logical units and new data corresponding to the write command are received, wherein the first logical unit is mapped to a first physical unit among the physical units in the first data area,
wherein a switched writing procedure is executed when the erase count difference is larger than the erase count difference threshold, and the switched writing procedure comprises:
getting a second physical unit from the physical units in the second spare area; and
writing the new data into the second physical unit.

11. The rewritable non-volatile memory controller according to claim 10, wherein the switched writing procedure further comprises:
associating the second physical unit to the second data area and re-mapping the first logical unit to the second physical unit.

12. The rewritable non-volatile memory controller according to claim 11, wherein the microprocessor unit further calculates a logical unit amount difference and determines whether the logical unit amount difference is equal to a logical unit amount difference threshold, wherein the logical unit amount difference is obtained by deducting the number of the logical units mapped to the physical units in the second data area from the number of the logical units mapped to the physical units in the first data area,
wherein the memory management unit further executes a wear levelling procedure when the logical unit amount difference is equal to the logical unit amount difference threshold, and the wear levelling procedure comprises:
getting a fourth physical unit from the physical units in the first spare area;
getting a fifth physical unit from the physical units in the second data area, wherein the fifth physical unit is mapped to a second logical unit among the logical units;
moving valid data in the third logical unit to the fourth physical unit; and
associating the fourth physical unit to the first data area, associating the fifth physical unit to the second spare area, and re-mapping the second logical unit to the fourth physical unit.

13. The rewritable non-volatile memory controller according to claim 10, wherein the memory management unit executes a general writing procedure when the erase count difference is not larger than the erase count difference threshold, and the general writing procedure comprises:
getting a third physical unit from the physical units in the first spare area; and
writing the new data into the third physical unit.

14. The rewritable non-volatile memory controller according to claim 10, wherein the microprocessor unit further calculates a logical unit amount difference, wherein the logical unit amount difference is obtained by deducting the number of the logical units mapped to the physical units in the second data area from the number of the logical units mapped to the physical units in the first data area,
wherein the procedure of determining whether the erase count difference is larger than the erase count difference threshold comprises: determining whether the erase count difference is larger than the erase count difference threshold and whether the logical unit amount difference is smaller than a logical unit amount difference threshold,
wherein the switched writing procedure is executed when the erase count difference is larger than the erase count difference threshold and the logical unit amount difference is smaller than the logical unit amount difference threshold.

15. A rewritable non-volatile memory storage system, comprising:
a connector;
a memory chip, having a plurality of physical units; and
a rewritable non-volatile memory controller, coupled to the memory chip and the connector, configured for executing:
configuring a plurality of logical units;
grouping the physical units into a first physical unit group and a second physical unit group;
grouping a portion of the physical units in the first physical unit group into a first data area and a first spare area corresponding to the first data area;
grouping a portion of the physical units in the second physical unit group into a second data area and a second spare area corresponding to the second data area;
mapping the logical units to the physical units in the first data area and the second data area;

recording erase counts corresponding to a plurality of the physical units in the first physical unit group and the second physical unit group;

calculating a first erase count of the first physical unit group and a second erase count of the second physical unit group according to the erase counts, and calculating an erase count difference between the first erase count and the second erase count; and determining whether the erase count difference is larger than an erase count difference threshold when a write command corresponding to a first logical unit among the logical units and new data corresponding to the write command are received, wherein the first logical unit is mapped to a first physical unit among the physical units in the first data area, wherein a switched writing procedure is executed when the erase count difference is larger than the erase count difference threshold, and the switched writing procedure comprises:

getting a second physical unit from the physical units in the second spare area; and writing the new data into the second physical unit.

16. The rewritable non-volatile memory storage system according to claim 15, wherein the switched writing procedure further comprises:

associating the second physical unit to the second data area and re-mapping the first logical unit to the second physical unit.

17. The rewritable non-volatile memory storage system according to claim 16, wherein the rewritable non-volatile memory controller further calculates a logical unit amount difference and determines whether the logical unit amount difference is equal to a logical unit amount difference threshold, wherein the logical unit amount difference is obtained by deducting the number of the logical units mapped to the physical units in the second data area from the number of the logical units mapped to the physical units in the first data area, Wherein the rewritable non-volatile memory controller further executes a wear levelling procedure when the logical unit amount difference is equal to the logical unit amount difference threshold, and the wear levelling procedure comprises:

getting a fourth physical unit from the physical units in the first spare area;

getting a fifth physical unit from the physical units in the second data area, wherein the fifth physical unit is mapped to a second logical unit among the logical units;

moving valid data in the third logical unit to the fourth physical unit; and associating the fourth physical unit to the first data area, associating the fifth physical unit to the second spare area, and re-mapping the second logical unit to the fourth physical unit.

18. The rewritable non-volatile memory storage system according to claim 15, wherein the rewritable non-volatile memory controller executes a general writing procedure when the erase count difference is not larger than the erase count difference threshold, and the general writing procedure comprises:

getting a third physical unit from the physical units in the first spare area; and writing the new data into the third physical unit.

19. The rewritable non-volatile memory storage system according to claim 18, wherein the general writing procedure further comprises:

moving valid data in the first physical unit to the third physical unit by using a copyback command set, wherein the copyback command set is used for reproducing and writing data in the memory chip.

20. The rewritable non-volatile memory storage system according to claim 18, wherein the general writing procedure further comprises:

associating the third physical unit to the first data area, and re-mapping the first logical unit to the third physical unit.

21. The rewritable non-volatile memory storage system according to claim 15, wherein the physical units in the memory chip respectively belong to a first plane and a second plane, wherein the rewritable non-volatile memory controller groups the physical units belonging to the first plane into the first physical unit group and the physical units belonging to the second plane into the second physical unit group, wherein data corresponding to the first plane cannot be copied to the second plane by the copyback command set, and data corresponding to the second plane cannot be copied to the first plane by the copyback command set.

22. The rewritable non-volatile memory storage system according to claim 15, wherein the rewritable non-volatile memory controller further calculates a logical unit amount difference, wherein the logical unit amount difference is obtained by deducting a number of the logical units mapped to the physical units in the second data area from a number of the logical units mapped to the physical units in the first data area, wherein the procedure of determining whether the erase count difference is larger than the erase count difference threshold comprises: determining whether the erase count difference is larger than the erase count difference threshold and whether the logical unit amount difference is smaller than a logical unit amount difference threshold, wherein the switched writing procedure is executed when the erase count difference is larger than the erase count difference threshold and the logical unit amount difference is smaller than the logical unit amount difference threshold.

23. The rewritable non-volatile memory storage system according to claim 15, wherein the rewritable non-volatile memory controller further configures an erase count for the memory chip, wherein the rewritable non-volatile memory controller further determines whether the erase count is equal to a predetermined value when the write command corresponding to the first logical unit among the logical units and the new data corresponding to the write command are received, wherein the procedure of determining whether the erase count difference is larger than the erase count difference threshold is executed when the erase count is equal to the predetermined value.

24. The rewritable non-volatile memory storage system according to claim 15, wherein the memory chip has a plurality of physical blocks, each of the physical blocks has a plurality of physical pages, and the physical pages of each of the physical blocks are individually written and simultaneously erased, wherein the physical units are composed of the physical blocks.

* * * * *